(12) United States Patent
Elias et al.

(10) Patent No.: US 9,376,029 B2
(45) Date of Patent: Jun. 28, 2016

(54) VEHICLE WITH AN ELECTRIC DRIVE

(75) Inventors: Björn Elias, Hepberg (DE); Christian Ohlen, Gaimersheim (DE); Anca Ebner, Wettstetten (DE)

(73) Assignee: AUDI AG, Ingolstadt (DE)

( * ) Notice: Subject to any disclaimer, the term of this patent is extended or adjusted under 35 U.S.C. 154(b) by 90 days.

(21) Appl. No.: 14/352,641

(22) PCT Filed: May 31, 2012

(86) PCT No.: PCT/EP2012/002294
§ 371 (c)(1),
(2), (4) Date: Jun. 11, 2014

(87) PCT Pub. No.: WO2013/056755
PCT Pub. Date: Apr. 25, 2013

(65) Prior Publication Data
US 2015/0151640 A1     Jun. 4, 2015

(30) Foreign Application Priority Data

Oct. 18, 2011   (DE) .......................... 10 2011 116 253

(51) Int. Cl.
*B60L 11/00*      (2006.01)
*B60L 11/18*      (2006.01)
*H01F 27/36*      (2006.01)
(Continued)

(52) U.S. Cl.
CPC ........... *B60L 11/182* (2013.01); *B60L 11/1831* (2013.01); *B60L 11/1833* (2013.01); *H01F 27/36* (2013.01); *H01F 27/365* (2013.01); *H01F 38/14* (2013.01); *H02J 7/025* (2013.01); *Y02T 10/7005* (2013.01); *Y02T 10/7072* (2013.01); *Y02T 90/12* (2013.01); *Y02T 90/121* (2013.01); *Y02T 90/122* (2013.01); *Y02T 90/125* (2013.01); *Y02T 90/14* (2013.01)

(58) Field of Classification Search
CPC .............. B60L 11/182; B60L 11/1831; B60L 11/1833; H01F 37/36; H01F 27/365; H01F 38/14
USPC .................. 293/102, 117; 296/187.04, 187.09
See application file for complete search history.

(56) References Cited

U.S. PATENT DOCUMENTS

| 2010/0277121 A1 | 11/2010 | Hall et al. |
| 2012/0280652 A1 | 11/2012 | Welschholz |

FOREIGN PATENT DOCUMENTS

| CN | 101179208 | 5/2008 |
| CN | 102089955 | 6/2011 |
| DE | 24 34 890 | 11/1975 |

(Continued)

OTHER PUBLICATIONS

International Search Report issued by the European Patent Office in International Application PCT/EP2012/002294 on Dec. 6, 2012.

(Continued)

*Primary Examiner* — Joseph D Pape
(74) *Attorney, Agent, or Firm* — Henry M. Feiereisen LLC

(57) ABSTRACT

A vehicle with an electric drive includes at least one deformation element for protection of pedestrians, which is at least partially formed of a foamed material; at least one secondary transformer unit for electrically charging an energy storage device of the vehicle; and at least one shielding element configured to prevent propagation of electromagnetic radiation emitted from the secondary transformer unit into the vehicle.

8 Claims, 2 Drawing Sheets

(51) Int. Cl.
*H01F 38/14* (2006.01)
*H02J 7/02* (2016.01)

(56) References Cited

FOREIGN PATENT DOCUMENTS

| DE | 102009060177 | 10/2010 |
|---|---|---|
| DE | 202010007613 | 11/2010 |
| DE | 102009023409 | 12/2010 |
| EP | 0 552 736 | 1/1993 |
| EP | 0 823 716 | 2/1998 |
| WO | WO84/04212 | 10/1984 |
| WO | WO 2008/140333 | 11/2008 |

OTHER PUBLICATIONS

Chinese Search Report issued by the Chinese Patent Office in Chinese Patent Application No. 2012800512672 on Jul. 1, 2015.
English translation of Chinese Search Report issued by the Chinese Patent Office in Chinese Patent Application No. 2012800512672 on Jul. 1, 2015.

VEHICLE WITH AN ELECTRIC DRIVE

CROSS-REFERENCES TO RELATED APPLICATIONS

This application is the U.S. National Stage of International Application No. PCT/EP2012/002294, filed May 31, 2012, which designated the United States and has been published as International Publication No. WO 2013/056755 and which claims the priority of German Patent Application, Serial No. 10 2011 116 253.8, filed Oct. 18, 2011, pursuant to 35 U.S.C. 119(a)-(d).

BACKGROUND OF THE INVENTION

The invention relates to a vehicle with an electric drive.

Motor vehicles with an electric drive, such as hybrid cars and pure electric cars, which have traction batteries for supplying electric power to an electric motor, are known in the art. These conventional motor vehicles are equipped with a system for inductive energy transfer, which also allows a frequent recharging of the batteries with ease of use. This system works like a transformer and includes a primary transformer unit installed on the infrastructure side, for example on the rear wall of a garage, and a secondary transformer unit that is integrated at the front of the motor vehicle behind the front license plate.

The document DE 24 34 890 B1 relates to an apparatus for connecting a charger arranged in a motor vehicle with an AC grid or three-phase grid and forms the basis for the preamble of claim 1 This document discloses a motor vehicle that can be driven by an electric rechargeable energy storage device having an apparatus for connecting a charger disposed in the motor vehicle with an AC grid or three-phase grid of a utility company at a parking location. This apparatus consists of a split transformer whose part having the primary windings is connected at the parking location to the power grid and whose part having the secondary windings in the motor vehicle is connected with the charger. The mutually associated primary and secondary windings are consecutively arranged on a core. The two transformer parts are formed by dividing the core. The transformer part associated with the motor vehicle is arranged in a front bumper of the motor vehicle and the transformer part associated with the parking location is arranged in a horizontal charging plank of the parking location. Both the transformer part associated with the motor vehicle in the bumper and the bumper as well as the transformer part in the charging plank associated with the parking location are resiliently mounted by means of helical springs, to allow coupling of the two transformer parts without an air gap.

Since the conventional apparatus, in particular its transformer part associated with the motor vehicle, emits electromagnetic radiation during the charging process, this radiation can interfere with on-board electronics.

A truck with an electrical energy storage device is known from DE 24 34 890 B1, which can be charged via a transformer with electrical energy. The transformer is formed, on the one hand, by vehicle-side coils and, on the other hand, by coils arranged at a parking location, which are electrically connected to an AC power grid or three-phase power grid of a utility company.

DE 10 2009 060 177 A1 also discloses a conventional motor vehicle.

SUMMARY OF THE INVENTION

It is the object of the invention to improve a vehicle with an electric drive with respect to interference from electromagnetic radiation.

The invention proposes a vehicle with an electric drive, which has a deformation element formed of foam for the protection of pedestrians, wherein the vehicle also includes a secondary transformer unit for charging an energy storage device with electrical energy via a transformer and a shielding element constructed as a plate against electromagnetic radiation, which is designed to prevent propagation of electromagnetic radiation into the vehicle, and wherein the deformation element is arranged between the secondary transformer unit, on the one hand, and the shielding element, on the other hand.

This shielding element can be arranged, as required, in the vicinity of the secondary transformer unit so as to prevent the propagation of electromagnetic radiation emitted from the secondary transformer unit in particular into the vehicle or in the backward or forward direction of travel, thereby reducing the interference with onboard electronics and other electronic components of the vehicle, which are located farther to the rear or to the front in the direction travel.

It may be provided that at least one of the shielding elements is arranged between the secondary transformer unit and the deformation element and/or that at least one of the deformation elements is arranged between the secondary transformer unit and the shielding element.

This provides flexible installation options for the shielding elements and the deformation elements, depending on the particular circumstances.

Since in the apparatus disclosed in DE 24 34 890 B1, the transformer part associated with the motor vehicle is attached to a front bumper of the vehicle, it is invariably integrated into an area of the vehicle that has a significant effect on the crash behavior in accidents involving pedestrian when driving forward. In particular, the front of the vehicle becomes harder due to the additionally installed components, in particular the half-transformer core usually composed of magnetic steel sheets or ferrite; however, a well-defined and smooth vehicle front is necessary to minimize the risk of injury to pedestrians. Since the conventional secondary transformer unit is mounted at the front bumper behind the front license plate, less space remains available for deformation elements made of foam arranged between the bumper and the passenger compartment, requiring a reduction in their thickness, i.e. its extent in the direction of travel. This leads to a further increase of the hardness of the vehicle front When in the proposed vehicle a deformation element is arranged between the secondary transformer unit and the shielding element, especially at the front or at the rear of the vehicle, the shielding element is advantageously located outside the region that has a direct influence on the crash behavior in accidents involving pedestrians when driving forward or in reverse, and more particularly at a greater distance from the front or the rear.

It may be provided that at least one of the deformation elements is arranged at a front of the vehicle;

at least one of the secondary transformer units is arranged at the front in the direction of travel in front of the deformation element;

at least one of the shielding elements is disposed at the front in the direction of travel behind the secondary transformer unit.

Since a shielding element is disposed behind the secondary transformer unit, it prevents the propagation of electromagnetic radiation emitted from the secondary transformer unit into the vehicle towards the rear opposite the direction of travel and reduces interference with onboard electronics and other electronic components of the vehicle located farther toward the rear in the direction of travel.

It may be provided that
- at least one of the deformation elements is arranged at a rear of the vehicle;
- at least one of the secondary transformer units is arranged at the rear behind the deformation element in the direction of travel;
- at least one of the shielding elements is arranged at the rear in front of the secondary transformer unit in the direction of travel.

Since a shielding element is arranged in front of the secondary transformer unit, it prevents the propagation of electromagnetic radiation emitted from the secondary transformer unit into the vehicle toward the front opposite the direction of travel and reduces interference with onboard electronics and other electronic components of the vehicle located farther forward in opposition to the direction of travel.

It may be provided that at least one of the shielding elements includes at least one plate made of an electrically conductive material and/or at least one apertured plate made of an electrically conductive material and/or at least one grid made of an electrically conductive material and/or at least one network made of an electrically conductive material and/or at least one film made of an electrically conductive material.

The plate may be, for example, a metal sheet or film made of metal. Each electrically conductive material may be arbitrarily selected as required and contain, for example, at least one metal and/or carbon and/or at least one electrically self-conducting or intrinsically conducting plastic material and/or at least one electrically conductive plastic mixture. The metal may be, for example, aluminum or copper or an alloy with aluminum or copper. The electrically self-conducting or intrinsically conductive plastic material may be, for example, polyaniline (PANI), polypyrrole (PPy) or polythiophene (PT). The electrically conductive plastic mixture may contain, for example, at least one plastic material, in particular acrylonitrile-butadiene-styrene (ABS), polyamide (PA), polyaryletherketones (PAEK), polylactides (PLA), polycarbonate (PC), polyethylene (PE), polyethylene terephthalate (PET), polymethyl methacrylate (PMMA), polypropylene (PP), polystyrene (PS), polyurethane (PU), polyvinylchloride (PVC), aminoplast or phenoplast, and carbon black dispersed therein.

A shielding element that does not have a solid metal plate, but instead only a perforated plate and/or a grid and/or a network and/or a film, is less stable compared to a shielding element with a solid metal plate and can thus be easily deformed in a collision with a pedestrian in the direction of travel, especially bent or broken.

It may be provided that at least one of the deformation elements is at least partially made from at least one foamed material.

Such a deformation element provides a particularly low risk of injury to pedestrians.

Each proposed vehicle may further include a front license plate arranged at the front in the direction of travel in front of a secondary transformer unit, and/or a rear license plate arranged in the direction of travel behind a secondary transformer unit mounted at the rear.

It may be provided that the secondary transformer unit is substantially plate-shaped and has, for example, a thickness in an x-direction, a width in a y-direction and a height in a z-direction, wherein the thickness is less than the height and the height of less than the width. The x-direction corresponds to the direction of travel or the longitudinal direction of the vehicle, the y-direction corresponds to the transverse direction of the vehicle, and the z-direction corresponds to the vertical direction of the vehicle.

Such essentially plate-shaped secondary transformer unit can be easily deformed in a collision in the x-direction, in particular bent or broken through, and requires little installation space between the bumper and the passenger compartment, so that foam deformation elements to be installed in this region that is important for crash behavior may have a greater thickness.

Embodiments of the invention will now be described in more detail with reference to the accompanying drawings. The resulting individual features, however, are not limited to the individual embodiments, but may be combined with several of the above-described individual features and/or with features of other embodiments. The details in the drawings are to be understood as only illustrative, but not as limiting. The reference symbols included in the claims are not intended to limit the scope of the invention in any way, but merely refer to the embodiments shown in the drawings.

DETAILED DESCRIPTION OF PREFERRED EMBODIMENTS

Figure 1:
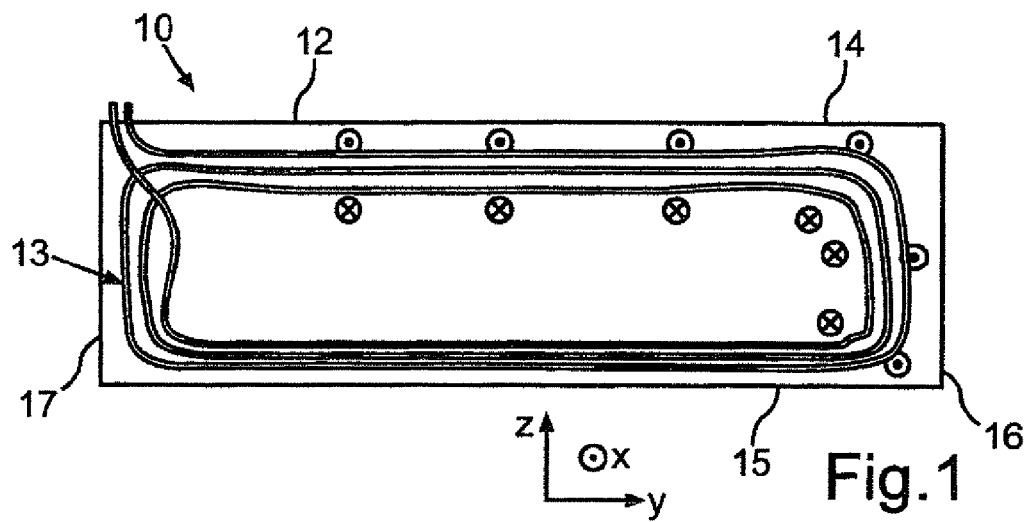
FIG. 1 a front view of a secondary transformer unit, which can be arranged at a front of a vehicle having an electric drive.
Figure 2:
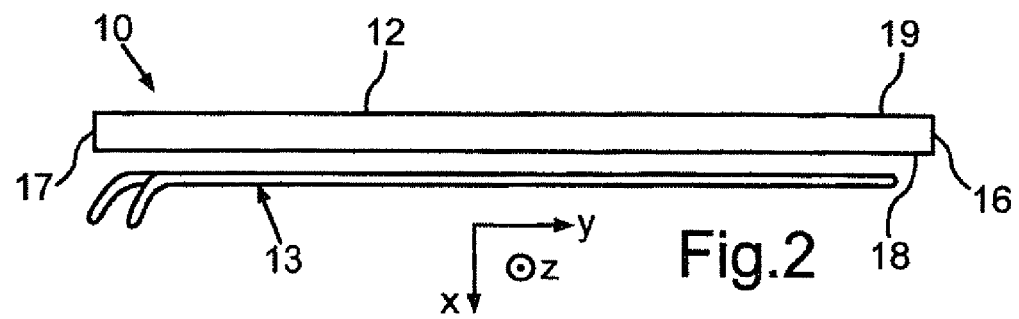
FIG. 2 the plan view of FIG. 1.
Figure 3:
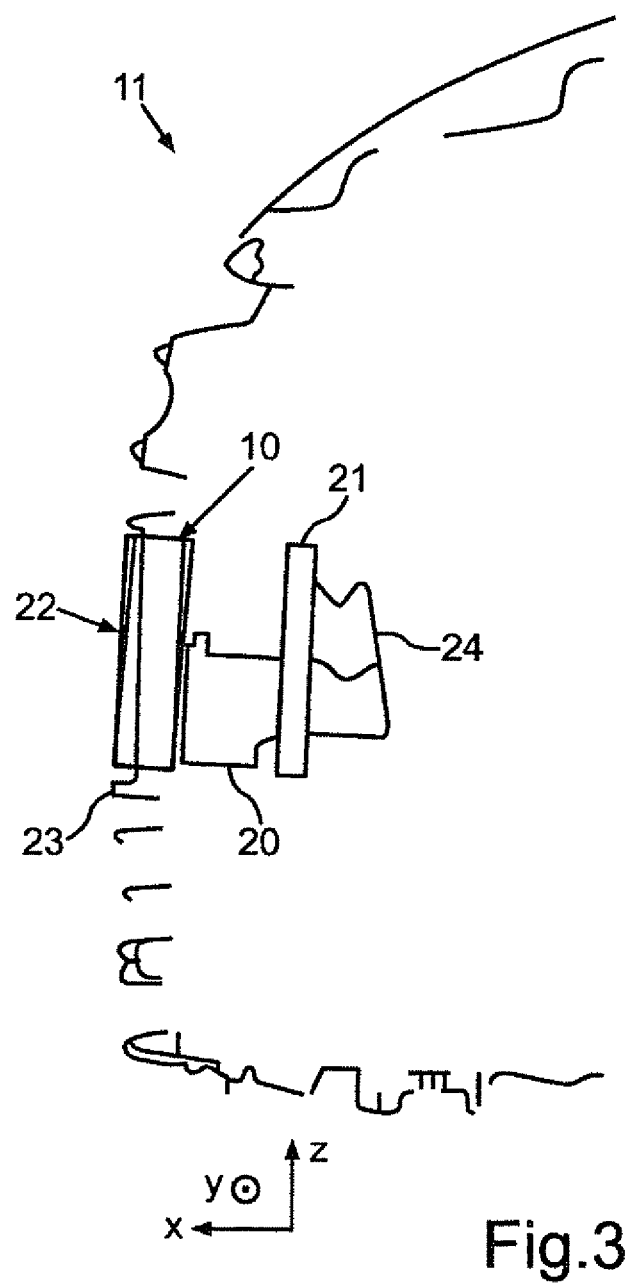
FIG. 3 a front view of a vehicle with an electric drive in a preferred embodiment.

FIGS. 1 and 2 illustrate schematically a secondary transformer unit 10 in a preferred embodiment for attachment to a vehicle 11 according to the invention with an electric drive (FIG. 3). This secondary transformer unit 10 includes a secondary core 12 and a secondary coil 13 arranged on the secondary core 12.

In this preferred embodiment, the secondary core 12 is plate-shaped, is made of ferrite, and has a top side 14, a bottom side 15, a left side 16, a right side 17, a front side 18 and a back side 19. The top side 14 and the bottom side 15 delimit the secondary core 12 in a z-direction, which in FIG. 1 points to the top and in FIG. 2 toward the front out of the drawing plane. The left side 16 and the right side 17 delimit the secondary core 12 in a y-direction, which points in FIGS. 1 and 2 to the right. The front side 18 and back side 19 delimit the secondary core 12 in an x-direction which points in FIG. 1 toward the front out of the drawing plane and in FIG. 2 downwards. The x-direction corresponds to the direction of travel or the longitudinal direction of the vehicle 11, the Y-direction corresponds to the transverse direction of the vehicle 11, and the z-direction corresponds to the vertical direction of the vehicle 11. In addition, the secondary core 12 has a width in the y-direction that corresponds to the distance between the left side 16 and right side 17, a height in the z direction that corresponds to the distance between the top side 14 and the bottom side 15 and is significantly smaller than the width, and a thickness in the x direction that corresponds to the distance between the front side 18 and the back side 19 and is considerably smaller than the height.

In this preferred embodiment, the secondary coil 13 is arranged in three substantially rectangular turns on the front side 18 of the secondary core 12. An unillustrated primary transformer unit which includes a primary core and a primary coil arranged on the primary core is configured to generate a magnetic field when being placed at a small distance in front of the front side 18 and when an alternating current flows through its primary coil, with the field lines indicated in FIG.

1 by the circles with a dot and the circles with a cross. Field lines enter, for example, the front face 18 of the secondary core 12 at locations marked by the circles with a cross and exit the secondary core 12 at locations marked by the circles with a dot and extend inside the secondary core 12 from the circles with a cross to the circles with a dot. These field lines thus envelop the turns of the secondary coil 13 and induce therein an AC voltage which is supplied to an unillustrated high-voltage onboard electrical system of the vehicle 11 for charging its traction batteries.

In this preferred embodiment, the turns of the secondary coil 13 are glued to the front face 18 of the secondary core 12.

FIG. 3 shows schematically the front of a vehicle 11 with an electric drive according to the invention in a preferred embodiment in the form of a hybrid car. This vehicle 11 includes a secondary transformer unit 10 in the preferred embodiment, a deformation element 20 made of foamed material, a shielding element 21 in the form of a perforated plate made of aluminum, a front license plate 22, a front bumper 23 and a cross beam 24.

In this preferred embodiment, the secondary transformer unit 10 is arranged at the front of the vehicle 1 and attached with its rear side 19 to the front side of the bumper 23 facing forward in the x direction. Furthermore, the license plate 22 is arranged in the x-direction in front of the secondary transformer unit 10 and fastened with its rear side facing rearward opposite the x-direction to the front side 18. In this case, the license plate 22 is arranged and the turns of the secondary coil 13 are placed on the front side 18 such that the license plate 22 abuts the partial area of the front side 18 enclosed by the secondary coil 13 and the secondary coil 13 surrounds the license plate 22 without touching it.

In this preferred embodiment, the secondary transformer unit 10 is arranged in the direction of travel directly in front of the deformation element 20 and the shielding element 21 is arranged in the direction of travel directly behind the secondary transformer unit 10 so that the deformation element 20 is disposed between the secondary transformer unit 10 and the shielding element 21. The shielding element 21 is attached, with its rear side facing rearward opposite to the x-direction, to the front side of the cross beam 24 facing forward in the x-direction.

The invention claimed is:

1. A vehicle with an electric drive, comprising
at least one deformation element for protection of pedestrians, which is at least partially formed of a foamed material;
at least one secondary transformer unit for electrically charging an energy storage device of the vehicle via a transformer; and
at least one shielding element formed as a plate and configured to prevent propagation of electromagnetic radiation emitted from the secondary transformer unit into the vehicle,
wherein the deformation element is arranged between the secondary transformer unit and the shielding element.

2. The vehicle of claim 1, wherein
the at least one deformation element is arranged at a front of the vehicle;
the at least one secondary transformer unit is arranged at the front of the vehicle and in front of the deformation element in a direction of travel; and
the at least one shielding element is arranged at the front of the vehicle and behind the secondary transformer unit in the direction of travel.

3. The vehicle of claim 1, wherein
the at least one of the deformation element is arranged at a rear of the vehicle;
the at least one secondary transformer unit is arranged at the rear of the vehicle and behind the deformation element in a direction of travel; and
the at least one shielding element is arranged at the rear of the vehicle and in front of the secondary transformer unit in the direction of travel.

4. The vehicle of claim 1, wherein
the at least one shielding element is constructed in at least one of the following ways:
as a perforated plate made of an electrically conductive material, as at least one grid made of an electrically conductive material, as at least one network made of an electrically conductive material, and as at least one film made of an electrically conductive material.

5. A vehicle with an electric drive, comprising
at least one deformation element for protection of pedestrians, which is at least partially formed of a foamed material;
at least one secondary transformer unit for electrically charging an energy storage device of the vehicle via a transformer;
at least one shielding element formed as a plate and configured to prevent propagation of electromagnetic radiation emitted from the secondary transformer unit into the vehicle, and
a front license plate arranged in a direction of travel in front of the at least one secondary transformer unit,
wherein the at least one deformation element is arranged at a front of the vehicle between the secondary transformer unit and the shielding element,
wherein the at least one secondary transformer unit is arranged at the front of the vehicle and in front of the deformation element in the direction of travel, and
wherein the at least one shielding element is arranged at the front of the vehicle and behind the secondary transformer unit in the direction of travel.

6. A vehicle with an electric drive, comprising
at least one deformation element for protection of pedestrians, which is at least partially formed of a foamed material;
at least one secondary transformer unit for electrically charging an energy storage device of the vehicle via a transformer;
at least one shielding element formed as a plate and configured to prevent propagation of electromagnetic radiation emitted from the secondary transformer unit into the vehicle, and
a rear license plate arranged in a direction of travel behind the at least one secondary transformer unit,
wherein the at least one deformation element is arranged at a rear of the vehicle between the secondary transformer unit and the shielding element,
wherein the at least one secondary transformer unit is arranged at the rear of the vehicle and behind the deformation element in the direction of travel, and
wherein the at least one shielding element is arranged at the rear of the vehicle and in front of the secondary transformer unit in the direction of travel.

7. The vehicle of claim 5, wherein
the at least one shielding element is constructed in at least one of the following ways:
as a perforated plate made of an electrically conductive material, as at least one grid made of an electrically conductive material, as at least one mesh made of an electrically conductive material, and as at least one film made of an electrically conductive material.

8. The vehicle of claim 6, wherein the at least one shielding element is constructed in at least one of the following ways:
as a perforated plate made of an electrically conductive material, as at least one grid made of an electrically conductive material, as at least one mesh made of an electrically conductive material, and as at least one film made of an electrically conductive material.

* * * * *